May 7, 1957 L. J. CORKERY 2,791,084
POWER ADJUSTING MECHANISM FOR HARVESTER REELS
Filed Feb. 10, 1956 2 Sheets-Sheet 1

*INVENTOR.*
L. J. CORKERY

INVENTOR.
L. J. CORKERY

United States Patent Office 2,791,084
Patented May 7, 1957

2,791,084

POWER ADJUSTING MECHANISM FOR HARVESTER REELS

Leon J. Corkery, Moline, Ill., assignor to Deere & Company, Moline, Ill., a corporation of Illinois Application February 10, 1956, Serial No. 564,653

13 Claims. (Cl. 56—222)

This invention relates to power adjusting mechanism particularly adapted for use in accomplishing the vertical adjustment of a harvester reel in that type of harvester in which the reel rotates above the platform and cutting apparatus to facilitate the harvesting of crops.

Mechanism of the general character referred to above is not broadly new, but those of the prior art leave considerable to be desired in the way of simplicity, efficiency in operation and further have defective attributes that are sought to be eliminated by the improved and novel design forming the subject matter here.

It is relatively conventional practice to utilize, in the adjustment of a harvester reel, an upright rack secured to the harvester platform and rising in proximity to one end of the rotating reel shaft. The shaft is supported on the rack in such manner that the teeth of the rack are utilized to accomplish ascent or descent of the support along the rack. In some cases, the vertical movement is achieved by a jacking action, as in the U. S. patent to Lohse 2,414,958, in which the motive power is strictly manual. In other cases, power is derived from the rotating reel, as in the U. S. patent to Chapman et al. 2,572,700. In the latter patent, descent of the reel is accomplished by gravity, and, accordingly, some form of braking means must be provided. According to the present invention, this disadvantage, as well as disadvantages characteristic of manually operated mechanisms, are eliminated, primarily through the use of reversible gearing including a worm gear which is inherently nonreversible except when positively driven and therefore acts when not driven to hold the reel in any selected position when the reversible gearing occupies a neutral condition. Consequently, a separate braking device is not required. The invention further features a novel form of driving mechanism, including a clutch, which is connectible to drive the worm either forwardly or rearwardly or disconnectible to immobilize the worm. A still further object of the invention resides in means for automatically throwing the clutch out of engagement when the reel reaches a predetermined lowered position, thus avoiding conflict between the rotating reel and the cutting apparatus.

The foregoing and other important objects and desirable features inherent in and encompassed by the invention will become apparent as a preferred embodiment of the invention is disclosed by way of example in the ensuing specification and accompanying sheets of drawings, the several figures of which will be described immediately below.

Figure 1:
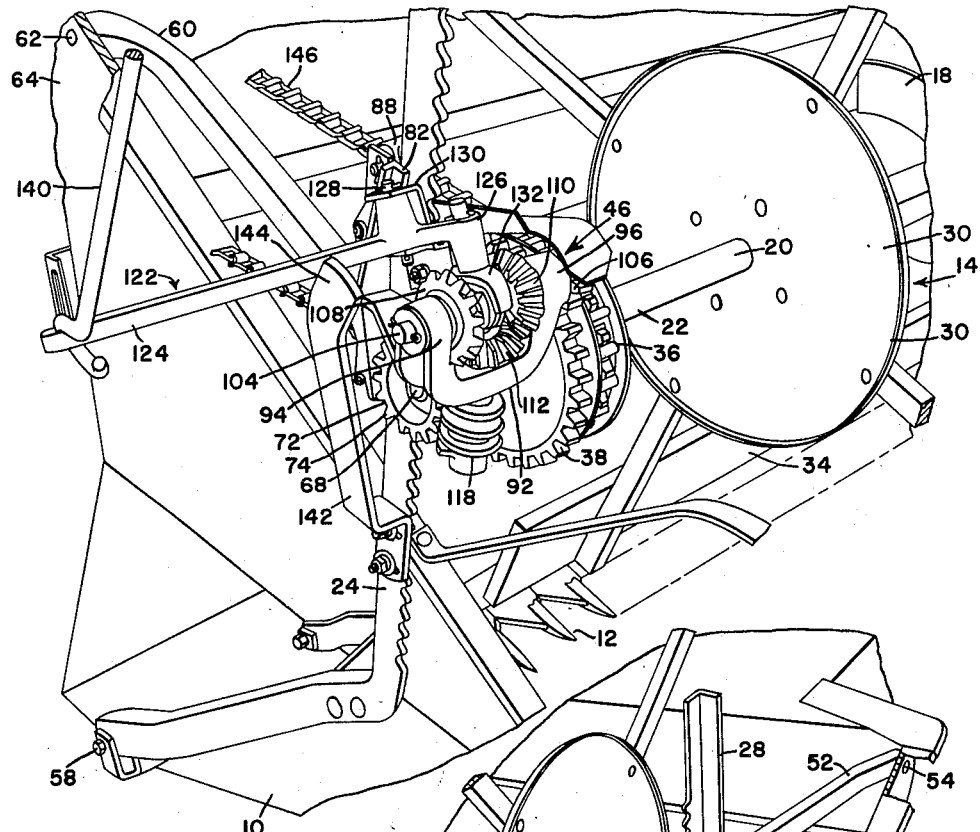
Fig. 1 is a fragmentary perspective view illustrating the improved adjusting mechanism in association with proximate portions of a harvester platform and reel.
Figure 2:
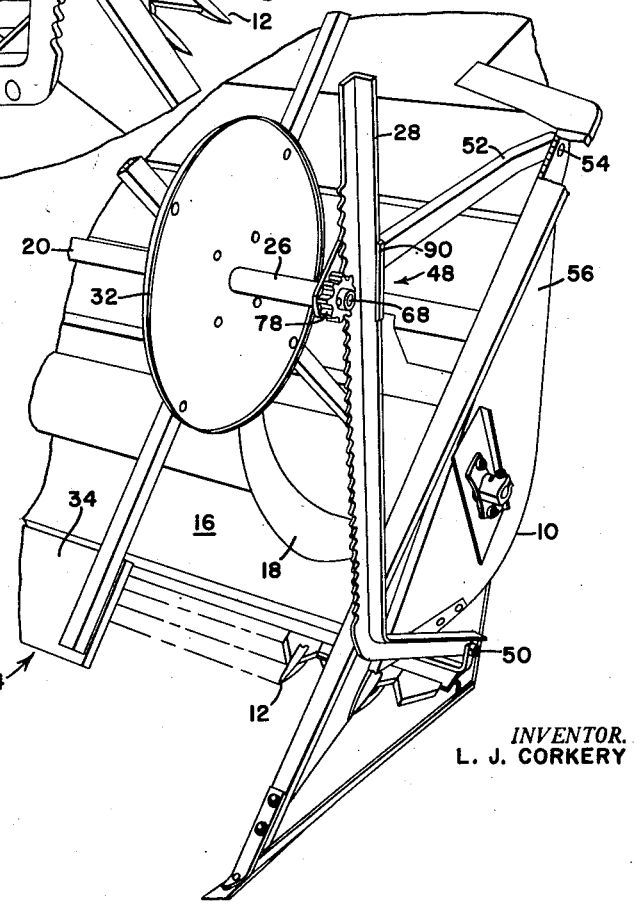
Fig. 2 is a fragmentary perspective view showing the opposite end of the harvester platform.
Figure 3:
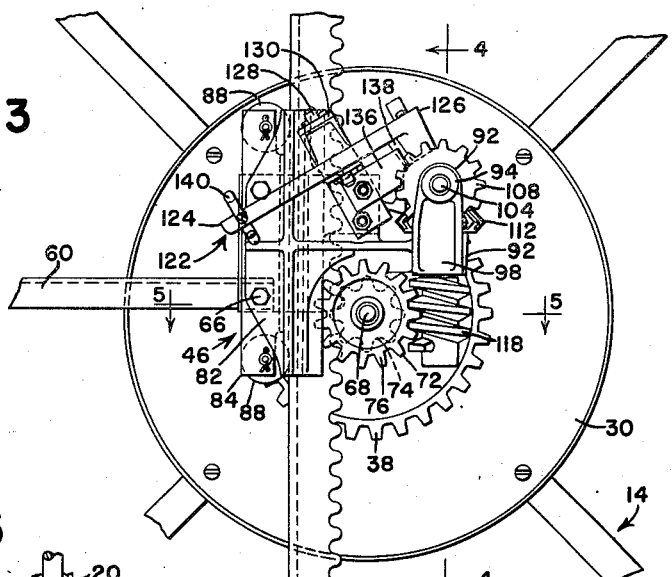
Fig. 3 is a fragmentary elevational view, on an enlarged scale, of the adjusting mechanism and its relationship to the proximate end of the reel.

Those familiar with harvesters of the sickle bar type will recognize in Figs. 1 and 2 a harvester platform at 10, which platform extends transversely to the line of travel of the harvester and has a leading edge along which is cutting apparatus 12 of any conventional construction. A rotatable reel 14 rotates in a clockwise direction as seen in Figs. 1 and 3 to move crops rearwardly over the cutting apparatus 12 and onto the platform 10, a forward portion of which is in the form of a trough 16 over which an auger conveyor 18 operates to facilitate handling of the crop.

Figure 5:
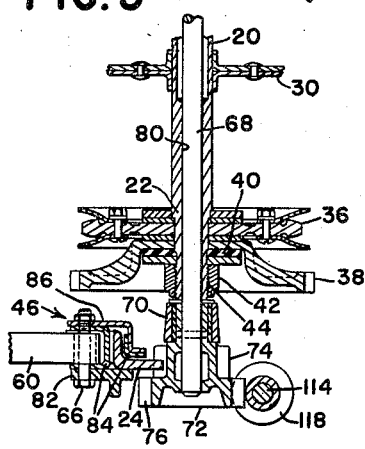
Fig. 5 is a section as seen along the line 5—5 of Fig. 3.

The reel 14 is here shown as being of typical construction, having an elongated hollow reel shaft 20, the right hand end 22 of which is proximate to an upright right hand rack 24 and the left hand end 26 of which is proximate to an upright left hand rack 28. Reel hubs 30 and 32 are rigidly secured to the tubular reel shaft 20 in coaxially spaced apart relationship and carry conventional reel bats 34. The right hand end 22 of the reel shaft 20 has secured thereto for rotation therewith a reel-driving sprocket 36. For the purposes of the present disclosure, it may be considered that the sprocket 36 is keyed or otherwise secured to the reel shaft 20; however, in a practical design such as shown, the sprocket 36, as well as a driving gear 38, utilizes a slip clutch connection at 40 to the reel shaft. As best seen in Fig. 5, the slip clutch is made up of a plurality of washers and an adjusting nut 42 between which the sprocket 36 and gear 38 are sandwiched, the extreme right hand end of the shaft 20 being threaded at 44 to accommodate the nut 42. These details may be varied to suit individual desires and are therefore described rather generally, it being important only that a slip clutch be used, as a matter of safety and practical design.

The right hand end 22 of the reel shaft 20 is journaled in a right hand main support 46, and a left hand main support 48, of less complex structure than the support 46, carries the left hand end 26 of the reel shaft on the left hand rack 28. As best seen in Fig. 2, the left hand rack 28 is pivotally connected at its lower end at 50 to a portion of the platform 10, and a brace 52, pivotally connected at its forward end (not shown) to the support 48, extends rearwardly to a pivotal connection 54 with a left hand side sheet 56 of the platform. Substantially the same principles are involved in the mounting of the right hand rack 24 and right hand main support 46, the right hand rack 24 being pivotally mounted at its lower end at 58 to the platform 10, and a brace 60 extends between a rear pivotal connection 62 to a right hand side sheet 64 and a front pivotal connection 66 with the main support 46 (Figs. 3 and 5). As will be brought out below, changes in the vertical position of the reel cause changes in the fore-and-aft positions of the racks 24 and 28; hence, the pivotal mountings at 50, 54, 58 and 62.

One of the main purposes involved in the use of the two racks 24 and 28 is to accomplish equalization of vertical movement of opposite ends of the reel. For this purpose, an equalizer shaft 68 extends coaxially through the tubular reel shaft 20 and is journaled at its left hand end in the left hand main support 48 and is journaled at its right hand end in the right hand main support 46 (Fig. 5). The right hand support 46 is preferably in the form of a casting and includes an integral portion 70 which affords a bearing for the equalizer shaft 62, the portion 70 being interposed between the driving gear 38 and pinion means 72 keyed to the extreme right hand end of the shaft 68. The pinion means 72 comprises a small pinion 74, in constant mesh with the rack 24, and a larger pinion 76 for purposes to presently appear. A single pinion 78 is keyed to the left hand end of the shaft 68 and is in constant mesh with the rack 28. It will thus be seen that rotation imparted to the pinion means 72 is transmitted via the shaft 68 to the pinion 78, causing both pinions to ascend or descend their respective racks at the same time and at the same speed, accordingly keeping the reel level as the vertical position thereof is changed. This alone is a common expedient and no novelty therefor is claimed here.

The manner in which the supports 46 and 48 journal the reel shaft 20 will become apparent when it is considered that the reel shaft 20 is itself journaled, as at 80 (Fig. 5) on the shaft 68 which, as has already been described, is journaled at its opposite ends in the left hand support 48 and in the bearing portion 70 of the right hand support 46. Other means for journaling the two shafts could be provided within the spirit of the present invention, it being noted that the particular design illustrated lends itself to compactness and economy of manufacture.

As best seen in Fig. 3, the support 46 is in the form of a T lying on its side, having, in addition to the bearing portion previously described, an upright web 82 provided with front and rear shoes 84 that ride or slidably engage the transverse web of the angle-iron upright rack 24. The shoes are retained by a clip 86 which is held in place by a plurality of fasteners, one of which affords the previously described pivot 66. The rear shoe 84 carries a pair of vertically spaced rollers 88 for reducing friction between the support 46 and the rack 24. The accomplishment of a similar relationship between the support 48 and the left hand rack 28 is achieved by a rear shoe 90, which is considered sufficient, in conjunction with the pinion 78, for maintaining the proper relationship between the support and the rack.

Figure 4:
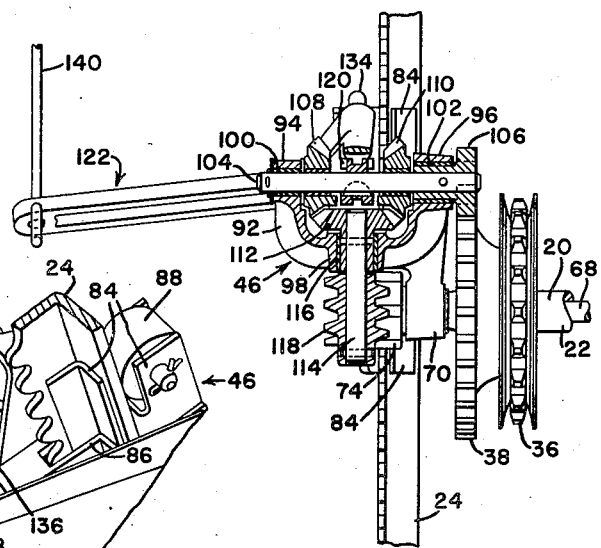
Fig. 4 is a section as seen along the line 4—4 of Fig. 3.

As best seen in Figs. 1 and 4, the support 46 has integrally formed therewith a portion 92 shaped generally as a Y, which configuration is effected by the provision of a pair of upstanding arms 94 and 96 and a depending leg 98. The arms 94 and 96 are coaxially bored on an axis parallel to the axis of the reel shaft and thus afford bearings 100 and 102 for journaling an input shaft 104. This shaft has appropriately pinned or otherwise fixed to its left hand end an input gear 106 which is in constant mesh with the driving gear 38. The gears 38 and 106, together with other gears to be presently described, constitute power transmission means for driving the pinion means 72 and thus for supplying power from the rotating reel to the pinion means for power raising and lowering of the reel relative to the platform.

The other gearing includes a pair of bevel gears 108 and 110, journaled on the input shaft 104 between the arms 94 and 96, and a third bevel gear 112 keyed to the upper end of a worm shaft 114 that is journaled in the depending leg 98 of the support 46 via a bearing 116. A worm 118, pinned or otherwise fixed to the worm shaft 114, is in constant mesh with the larger pinion 76 of the pinion means 72.

The power transmission means is selectively connectible and disconnectible, because the gearing 108—110—112 is selectively connectible, disconnectible or reversible, by means of a shiftable clutch 120 keyed to but axially slidable on the input shaft 104 between the input shaft bevel gears 108 and 110. Shifting of the clutch in one direction connects the clutch and consequently the input shaft to one of the bevel gears and shifting of the clutch in the opposite direction connects the other bevel gear. When the clutch is in its central or neutral position as shown in Fig. 4, neither of the bevel gears is connected to the input shaft and consequently the power transmitting means is idle. Because of the nonreversible character of the worm, the position of the reel relative to the racks is maintained without any separate braking means. Opposite interfaces of the bevel gears 108 and 110 have clutch teeth cooperating with clutch teeth on the clutch 120, which are deemed to be of such obvious character as to require no specific description.

Figure 6:
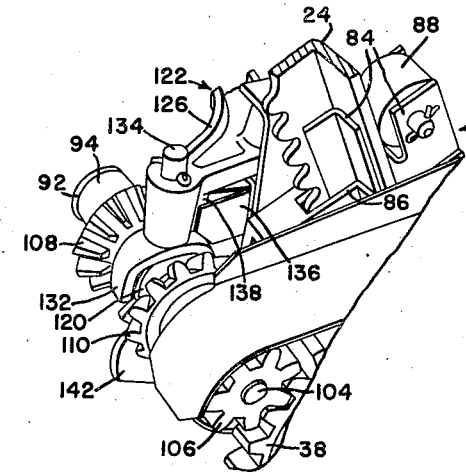
Fig. 6 is a fragmentary perspective as seen from the opposite side of Figs. 1 and 3.

The mechanism just described comprises selectively connectible and disconnectible and reversible gearing, the operative nature of which is established by the position of the shiftable clutch 120. This clutch is under control of a control lever in the form of a bell crank 122 having long and short arms 124 and 126 respectively and pivoted at 128 on a generally upright axis by means of a suitable bracket 130, in the form of a U, rigidly secured to the main support 46. The extreme forward end of the short arm 126 carries a clutch-shifting yoke 132, the connection between the yoke and the arm 126 including a generally upright pivot 134. As is typical of constructions of this type, the yoke 132 straddles the clutch 120 so that rocking of the control lever 122 about its pivot 128 on the main support 46 effects shifting of the clutch to selectively opposite sides of its neutral position, which position is maintained by biasing means in the form of a pair of leaf springs 136 (Fig. 6) rigidly secured to the support 46 and diverging forwardly to straddle a lug 138 on the under side of the short lever arm 126. The arrangement is such that the leaf springs 136 constitute biasing means to maintain the lever in a central position and thus to maintain the clutch 120 in a neutral position. Consequently, the lever 122 may be moved fore-and-aft, as by a remote control rod 140, to effect shifting of the clutch 120 by the yoke 132. Release of the application of force to the control lever 122 will be followed by automatic return of the clutch to its neutral position by the biasing means just described.

Downward movement of the reel is accomplished by forward movement of the control lever 122, which effects shifting of the clutch 120 to the left side of the machine (to the right as seen in Fig. 4) so as to engage the bevel gear 110 with the input shaft 104 and consequently to turn the worm 118 in such direction as to cause the pinion 74 to walk downwardly on the rack 24. The equalizing action achieved through the shaft 68 results in downward walking of the pinion 78 on the left hand rack 28. In order that possible conflict may be avoided between the reel and the cutting apparatus, means is provided here for automatically throwing the clutch back to neutral when the reel moves downwardly to a predetermined extent. This means takes the form of a cam 142 secured to the right hand rack 24 and extending upwardly and curving forwardly as at 144 so as to lie in the path of the forwardly swung lever 122 as this lever moves bodily downwardly with the entire support. When the predetermined position has been achieved, the portion 144 will cause the lever 122 to be moved rearwardly, effecting withdrawal of the remote control rod 140 from the operator's grasp, and the biasing means 136 will automatically return the clutch 120 to neutral. There is no need for an automatic throw-out for controlling upward movement of the reel; although, a cam such as that described at 142 could be used if desired.

The reel is typically powered by a drive chain 146 that is trained about the reel sprocket 36 and that derives power from the harvester in any suitable manner not important here.

In the neutral position of the selectively connectible and reversible gearing, as previously described, the clutch 120 occupies a central or neutral position, disengaged from both of the bevel gears 108 and 110. Accordingly, as drive is transmitted to the reel 14, the reel rotates in a clockwise direction as viewed in Figs. 1 and 3 and the driving gear 38 rotates the input shaft 104 via the input gear 106. However, because of the neutrol status of the mechanism, no drive is transmitted to the worm 118. When the operator desires to raise the reel, he thrusts rearwardly on the remote control rod 140, causing rocking of the control lever 122 rearwardly about its pivot 128 on the main support 46, which thereby swings the short arm 126 of the lever 122 to the right side of the machine (to the left as seen in the drawings), carrying the clutch 120 also to the right and into engagement with the righthand bevel gear 108. This connects the input shaft 104 to the bevel gear 108 and since the bevel gear is in constant mesh with the worm bevel gear 112, the worm 118 will be rotated. Since the reel rotates clockwise, the input pinion or gear 106 will rotate counterclockwise, as will the bevel gear 108. Therefore, the worm bevel gear 112, as well as the worm, will rotate in a counterclockwise direction as viewed from above. As the worm 118 rotates in the manner just described, it will cause counterclockwise rotation of the pinion means 72, wherefore the pinion 74, being in constant mesh with the rack 24, will climb the rack, as will the pinion 78 relative to the left hand rack 28, because of the interconnecting shaft 68. When the reel reaches the desired height, the operator may release the remote control rod 140 and the biasing means 136 will automatically return the control mechanism to its neutral or idle status.

As previously suggested, lowering of the reel is accomplished by a forward pull on the remote control rod 140, followed by forward swinging of the control lever 122 about its pivot to cause shifting of the clutch 120 to the left hand side of the machine (to the right as viewed in the drawings). The clutch 120 then engages the bevel gear 110 which is caused to rotate in a counterclockwise direction, in accordance with the counterclockwise rotation of the input shaft 104. The direction of rotation of the worm is now reversed as respects its previously described direction and it now rotates clockwise as viewed from above, effecting clockwise rotation of the pinion means 72 so that the pinions 74 and 78 walk simultaneously down their respective racks 24 and 28. When the reel reaches the lowermost position as determined by the throw-out cam 142, the clutch is automatically returned to neutral as previously set forth.

The various features and desirable operational characteristics of the novel adjusting mechanism have been described in connection with the disclosure. Other features and advantages will undoubtedly occur to those versed in the art, as will many modifications and alterations in the preferred embodiment disclosed, all of which may be achieved without departure from the spirit and scope of the invention.

What is claimed is:

1. In a harvester having a platform and a reel positioned thereabove and fixed to and rotatable with a horizontal reel shaft having one end proximate to a generally upright platform-mounted rack, the improvement comprising: a support engaging and movable vertically along the rack and having means journaling the one end of the reel shaft; a driving gear journaled on the support coaxially with the reel shaft; drive means connecting the driving gear and reel shaft for rotation in unison; an input shaft journaled on the support in parallel relation to the reel shaft and having an input gear fixed thereto and in constant mesh with the driving gear; pinion means journaled on the support coaxially with and rotatable relative to the reel shaft and meshing with the rack; an upright worm shaft journaled on the support on an axis intersecting the axis of the input shaft and having a worm rigid thereon and in constant mesh with the pinion means; a first bevel gear fixed to the end of the worm shaft proximate to the input shaft; second and third bevel gears journaled on the input shaft in coaxially spaced apart relation and in constant mesh with the first bevel gear respectively at diametrically spaced portions thereof; and shiftable clutch means rotatable with and axially slidable on the input shaft for connecting said input shaft selectively to either of the second and third bevel gears.

2. In a harvester having a platform and a reel positioned thereabove and fixed to and rotatable with a horizontal reel shaft having one end axially hollow and proximate to a generally upright platform-mounted rack, the improvement comprising: a support engaging and movable vertically along the rack; a driven shaft journaled on the support and extending coaxially into and journaling the hollow end of the reel shaft; a driving gear rotatable relative to the driven shaft and journaled on the support coaxially with the reel shaft; drive means connecting the driving gear and reel shaft for rotation in unison; an input shaft journaled on the support in parallel relation to the reel and driven shafts and having an input gear fixed thereto and in constant mesh with the driving gear; pinion means coaxially fixed to the driven shaft and meshing with the rack; an upright worm shaft journaled on the support on an axis intersecting the axis of the input shaft and having a worm rigid thereon and in constant mesh with the pinion means; a first bevel gear fixed to the end of the worm shaft proximate to the input shaft; second and third bevel gears journaled on the input shaft in coaxially spaced apart relation and in constant mesh with the first bevel gear respectively at diametrically spaced portions thereof; and shiftable clutch means rotatable with and axially slidable on the input shaft for connecting said input shaft selectively to either of the second and third bevel gears.

3. In a harvester having a platform and a reel positioned thereabove and fixed to and rotatable with a horizontal reel shaft having one end proximate to a generally upright platform-mounted rack, the improvement comprising: a support engaging and movable vertically along the rack and having means journaling the one end of the reel shaft; a driving gear journaled on the support; drive means connecting the driving gear and reel shaft for rotation in unison; an input shaft journaled on the support and having an input gear fixed thereto and in constant mesh with the driving gear; pinion means journaled on the support for rotation relative to the reel shaft and meshing with the rack; a worm shaft journaled on the support on an axis intersecting the axis of the input shaft and having a worm rigid thereon and in constant mesh with the pinion means; a first bevel gear fixed to the end of the worm shaft proximate to the input shaft; second and third bevel gears journaled on the input shaft in coaxially spaced apart relation and in constant mesh with the first bevel gear respectively at diametrically spaced portions thereof; and shiftable clutch means rotatable with and axially slidable on the input shaft for connecting said input shaft selectively to either of the second and third bevel gears.

4. In a harvester having a platform and a reel positioned thereabove and fixed to and rotatable with a horizontal reel shaft having one end proximate to a generally upright platform-mounted rack, the improvement comprising: a support engaging and movable vertically along the rack and having means journaling the one end of the reel shaft; a driving gear journaled on the support; drive means connecting the driving gear and reel shaft for rotation in unison; an input shaft journaled on the support and having an input gear fixed thereto and in constant mesh with the driving gear; pinion means journaled on the support for rotation relative to the reel shaft and meshing with the rack; and power transmission means drivingly interconnecting the input shaft and pinion means.

5. The invention defined in claim 4, in which: the power transmission means includes selectively connectible and disconnectible reversible gearing and clutch means having a neutral position incurring disconnection of said gearing and selectively shiftable to opposite sides of said neutral position to connect said gearing to rotate the pinion means forwardly or reversely and thereby to drive said pinion means in one or the other of opposite vertical directions along the rack.

6. The invention defined in claim 5, including: means operative in response to movement of the pinion means along the rack in at least one direction and to a predetermined extent for automatically returning the clutch means to its neutral position.

7. In a harvester having a platform and a reel positioned thereabove and fixed to and rotatable with a horizontal reel shaft having one end proximate to a generally upright platform-mounted rack, the improvement comprising: a support engaging and movable vertically along the rack and having means journaling the one end of the reel shaft; a driving gear journaled on the support; drive means connecting the driving gear and reel shaft for rotation in unison; an input shaft journaled on the support and having an input gear fixed thereto and in constant mesh with the driving gear; pinion means journaled on the support for rotation relative to the reel shaft and meshing with the rack; a worm shaft journaled on the support on an axis intersecting the axis of the input shaft and having a worm rigid thereon and in constant mesh with the pinion means; and selectively disconnectible and connectible driving means between the input shaft and worm shaft, including first gear means for driving the worm in one direction, second gear means for driving the worm in the opposite direction and a clutch having a neutral position incurring disconnection of both gear means and selectively shiftable to first and second active positions respectively at opposite sides of said neutral positions for respectively connecting the first or second gear means.

8. In a harvester having a platform and a reel positioned thereabove and fixed to and rotatable with a horizontal reel shaft having one end proximate to a generally upright platform-mounted rack, the improvement comprising: a support engaging and movable vertically along the rack and having means journaling the one end of the reel shaft; a driving gear journaled on the support; drive means connecting the driving gear and reel shaft for rotation in unison; pinion means journaled on the support for rotation relative to the reel shaft; a worm journaled on the support and meshing with the pinion means; and a disconnectible and reversible drive means for driving and disconnecting the worm from the driving gear.

9. In a harvester having a platform and a reel positioned thereabove and fixed to and rotatable with a horizontal reel shaft having one end proximate to a generally upright platform-mounted rack, the improvement comprising: a support engaging and movable vertically along the rack and having means journaling the one end of the reel shaft; pinion means journaled on the support for rotation relative to the reel shaft; a worm journaled on the support and meshing with the pinion means; and a disconnectible and reversible drive means for driving and disconnecting the worm from the reel shaft.

10. In a harvester having a platform and a reel positioned thereabove and fixed to and rotatable with a horizontal reel shaft having one end proximate to a generally upright platform-mounted rack, the improvement comprising: a support engaging and movable vertically along the rack and having means journaling the one end of the reel shaft; a driving gear journaled on the support coaxially with the reel shaft; drive means connecting the driving gear and reel shaft for rotation in unison; an input shaft parallel to the reel shaft and driven by the driving gear; a Y-shaped mounting element rigid on the support below the input shaft including a pair of upstanding arms spaced apart axially of and respectively affording bearings journaling the input shaft and a depending arm providing a bearing on an upright axis intersecting the input shaft axis; a worm shaft journaled in the bearing of the depending arm and having a worm thereon below said depending arm; pinion means journaled on the support and meshing with the worm and with the rack; disconnectible and reversible drive gearing carried in part by the input shaft between the upstanding arms and in part by the worm shaft above the depending arm; and control means carried by the support and engaging the gearing for selectively disconnecting and reversing said gearing.

11. In a harvester having a platform and a reel positioned thereabove and fixed to and rotatable with a horizontal reel shaft having one end proximate to a generally upright platform-mounted rack, the improvement comprising: a support engaging and movable vertically along the rack and having means journaling the one end of the reel shaft; pinion means journaled on the support for rotation relative to the reel shaft and meshing with the rack; disconnectible and reversible power transmission mechanism carried by the support for driving and disconnecting the pinion from the reel shaft and including a shiftable selector having a neutral position incurring disconnection of said mechanism and first and second active positions respectively at opposite sides of said neutral position for connecting said mechanism to drive the pinion means selectively in opposite directions along the rack; a control lever connected to the selector and pivoted to the support on a generally upright axis for swinging back and forth from opposite sides of a neutral position for shifting the selector; and a cam fixed to the rack and interposed in the path of the control lever as said lever moves with the support along the rack in at least one direction, said cam engaging the control lever to return the lever to its neutral position upon movement of the support along the rack for a predetermined distance in said one direction.

12. In a harvester having a platform and a reel positioned thereabove and fixed to and rotatable with a horizontal reel shaft having one end proximate to a generally upright platform-mounted rack, the improvement comprising a support engaging and movable vertically along the rack and having means journaling the one end of the reel shaft; drivable means carried by the support and meshing with the rack and including a worm journaled on the support for rotation relative to the reel shaft; and a disconnectible reversible drive means for driving and disconnecting the worm from the reel shaft.

13. In a harvester having a platform and a reel positioned thereabove and fixed to and rotatable with a horizontal reel shaft having one end proximate to a generally upright platform-mounted rack, the improvement comprising: a support engaging and movable vertically along the rack and having means journaling the one end of the reel shaft; pinion means journaled on the support for rotation relative to the reel shaft and in constant mesh with the rack; power transmission means between the reel shaft and pinion means for selectively driving and idling the pinion means, including first disconnectible driving means for rotating the pinion means in one direction, a second disconnectible driving means for rotating the pinion means in the opposite direction, and a clutch having a neutral position incurring disconnection of both driving means and selectively shiftable to opposite sides of said neutral position for respectively connecting the first or second driving means; means for shifting the clutch among its neutral and active positions, comprising a clutch lever engaging the clutch and pivoted on the support for swinging from either side of a central position incurring the neutral position of the clutch, means connected to and for swinging the lever and means biasing the lever to its central position, and including a lug on the lever and leaf spring means secured to the support and engaging the lug.

References Cited in the file of this patent
UNITED STATES PATENTS
2,770,939      Berg et al. _____ Nov. 20, 1956